Dec. 24, 1968   E. F. STUCKY   3,417,576
AIR CONDITIONER
Filed March 23, 1967

INVENTOR
Elmer F. Stucky

BY Hovey, Schmidt, Johnson & Hovey
ATTORNEYS 3,417,576
AIR CONDITIONER
Elmer F. Stucky, Hesston, Kans., assignor to Centaur, Incorporated, Newton, Kans., a corporation of Kansas
Filed Mar. 23, 1967, Ser. No. 625,415
9 Claims. (Cl. 62—244)

ABSTRACT OF THE DISCLOSURE

An air conditioner for agricultural and industrial vehicular equipment is mounted on the cab of the vehicle and utilizes a U-shaped condenser coil in conjunction with a pair of side air intakes to provide increased condenser capacity, eliminate windmilling of the condenser fans by ram air, and minimize reduction of the airflow across the condenser coil by clogging of the intakes caused by foreign matter in the air. Quick release fasteners adjacent each condenser intake provide a means of rapidly attaching and detaching a frame which carries a filter medium suited to the conditions to be encountered. A valved air duct communicates the evaporator airstream with the atmosphere to permit fresh air to be drawn into the evaporator stream as desired to pressurize the cab in order to prevent the ingress of fine dust and the like thereinto.

---

The primary object of this invention is to provide an improved air conditioner for agricultural and industrial vehicular equipment, such as tractors, combines, construction equipment and the like, which is more efficient in operation, less susceptible to the effects of foreign matter, and capable of preventing excessive intake of dust and fine particles into the cab of the vehicle by pressurization of the latter during operation.

As a corollary to the foregoing object, it is a specific aim of the instant invention to provide an air conditioner as aforesaid in which the condenser coil of the apparatus is subjected to ambient air obtained through intakes which do not face in the direction of travel of the vehicle, so that windmilling of the condenser fans by ram air is precluded. Additionally, it is a further object to provide the air conditioner with intakes for condenser cooling which face oppositely transversely of the direction of travel of the vehicle, in order that at least one of the intakes will at all times be protected from direct impingement of the prevailing winds thereon, and hence direct exposure to foreign matter carried by such winds.

Another important and specific object of the invention is to provide the air conditioner with readily removable filter media normally disposed in the condenser air intakes in intercepting relationship to the air drawn into the air conditioner through said intakes so that, during operation, the filter media may be removed, quickly cleaned, and replaced without unduly interrupting the work being performed by the vehicle. In this respect, it will be appreciated that, in the case of farm vehicles, the presence of chaff, lint, dust and leaves creates a particularly severe hazard. If allowed to collect on the condenser coil, such foreign matter seriously reduces the cooling efficiency of the unit and may cause an excessive rise in the temperature of the system, resulting in damage to the coil, possible bursting of the hoses that interconnect the various components of the system, compressor overloads, or mechanical failure of the entire system.

Still another important and specific object of the instant invention is to provide a means of pressurizing the cab of the vehicle to prevent ingress of fine dust and the like particularly common to agricultural environments. When the inlet of the evaporator blower of an air conditioner is communicated solely with the interior of the cab, the suction will at times draw dust into the cab to the discomfort of the operator, particularly if the operator is an allergy sufferer or has a condition that is aggravated by dust and the like.

Figure 1:
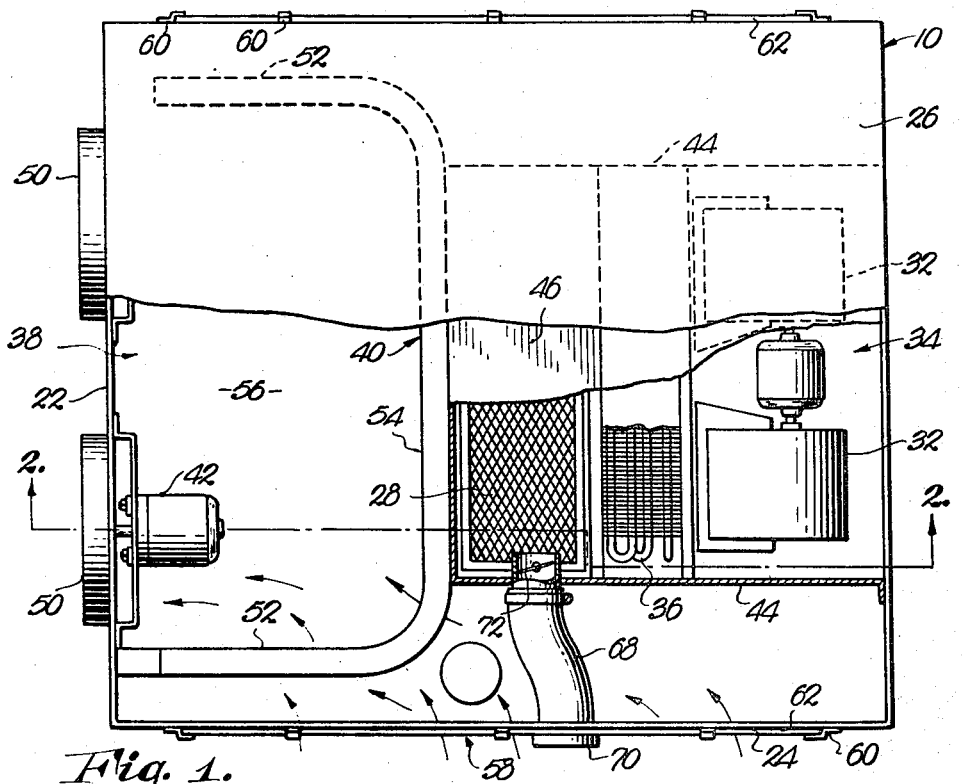
FIGURE 1 is a plan view of the air conditioner, a portion of the cover of the housing and the evaporator compartment being broken away to reveal interior components.

A housing 10 is mounted on the roof 12 of a vehicle cab, roof 12 having a pair of spaced openings 14 and 16 therein. Housing 10 includes a baseplate 18, a front wall 20, a rear wall 22, a pair of opposed sides 24, and a removable, insulated cover 26. An air inlet 28 is formed in baseplate 18 and registers with roof opening 14, inlet 28 including a suitable filter as illustrated. An air outlet 30 in baseplate 18 communicates a pair of blowers 32 with the interior of the cab through roof opening 16; normally, a louver housing (not shown) would be mounted in roof 12 and communicate with the bases of blowers 32 through opening 16 to permit adjustment of the airstream by the operator in the cab.

Figure 2:
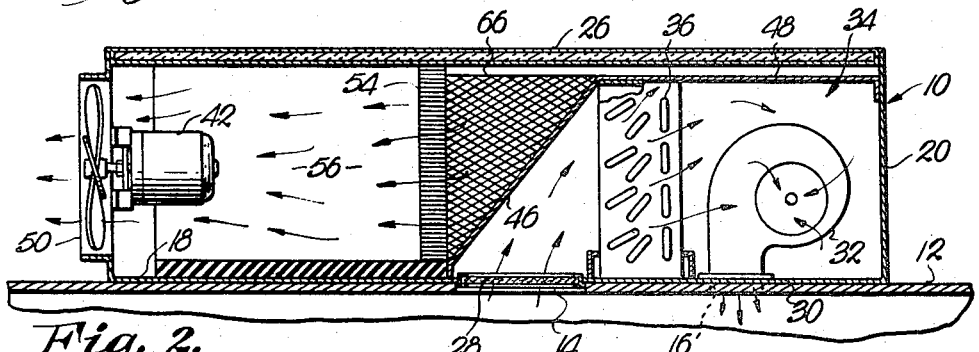
FIG. 2 is a vertical sectional view taken along line 2—2 of FIG. 1, showing the air conditioner mounted on the cab of the vehicle.

Housing 10 is divided into two separate compartments, a forward compartment 34 containing blowers 32 and an evaporator 36, and a rear compartment 38 containing a U-shaped condenser coil 40, and a pair of condenser fans 42, one of the fans being hidden from view. The forward compartment 34 is enclosed by a pair of side partitions 44 across partition 46, and a top plate 48, all of which cooperate with baseplate 18 and front wall 20 to encapsulate the blowers 32 and evaporator 36. Note that top plate 48 is spaced beneath cover 26, and particularly that the side partitions 44 are inwardly spaced from respective sides 24 of the housing. The cross partition 46, as is clear in FIG. 2, is forwardly inclined.

Rear wall 22 has a pair of air exhausts 50 therein formed by cylindrical cowls that surround the blades of fans 42. Condenser coil 40 has a pair of opposed, upright side sections 52 facing respective sides 24 of housing 10, and a third section 54 interconnecting sections 52 at the forward ends of the latter. It may be seen in FIG. 2 that section 54 stands upright and cooperates with cross partition 46 to define a lateral passage extending across the central, interior portion of housing 10 between the two compartments 34 and 38. The U-shaped condenser coil 40 has a height spanning the distance between baseplate 18 and cover 26, and cooperates therewith and with rear wall 22 to define a chamber 56 that is closed except for the airflow passages across coil 40 and the air exhausts 50.

Each side 24 has a rectangular opening therein extending from front to rear throughout a major expanse of the plane of the side, presenting an air intake 58 for flow of ambient air across the adjacent condenser section 52 and approximately the proximal half of section 54. The aforesaid lateral passage between section 54 and cross partition 46, therefore, affords a means by which air entering the housing through intakes 58 may flow across section 54 as well as the side sections 52 of the condenser.

A plurality of quick release fasteners 60 are attached to each side 24 and spaced around the corresponding intake 58 to provide a means of releasably securing a rectangular frame 62 to side 24. Each frame 62 mounts a filter medium which, as illustrated, may comprise a treated paper or synthetic resin foam filter 64 in conjunction with a wire mesh screen 66. Alternatively, screens 66 may be employed without filters 64, depending upon the dust condition to be encountered. Each fastener 60 is a tab having one end thereof rotatably secured to the associated side 24, the tab being movable by hand to and from the position illustrated in overlying, frictional engagement with frame 62.

Figure 3:
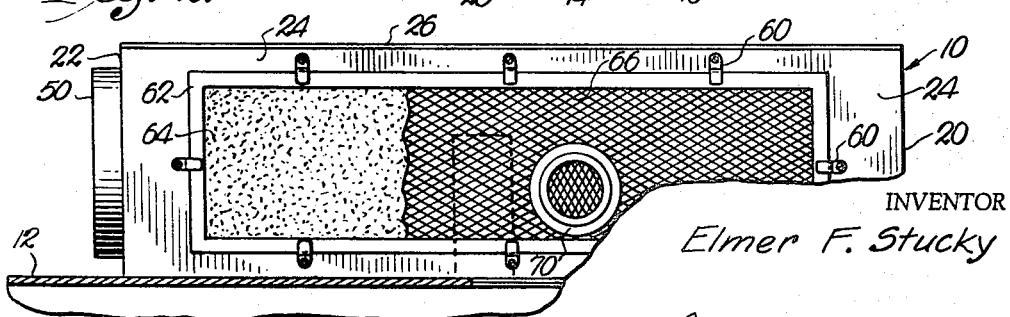
FIG. 3 is a side elevational view of the air conditioner, the roof of the cab being shown in section as in FIG. 2.

Evaporator 36 is located upstream from blowers 32 between the latter and air inlet 28. As shown in FIGS. 1 and 3, a duct 68 communicates the region between evaporator 36 and inlet 28 with the atmosphere through a cutout in the filter medium 64, 66 of one of the condenser air intakes 58. A filter cap 70 slips over the outer end of duct 68. A valve member 72 is rotatably mounted in duct 68 adjacent the inner end thereof within compartment 34, the position of valve member 72 being controlled by a suitable linkage (not shown) extending into the vehicle cab.

To clarify the illustration, the various interconnecting hoses, electrical power leads, and the expansion valve of the air conditioner are not shown in the figures. The compressor is a separate unit and is driven by the vehicle engine. If both heating and cooling is desired, a hot water heater may be added to the evaporator compartment 34 to provide heating of the airstream established by blowers 32.

The condenser fans 42 face the rear of the vehicle; hence, as the vehicle moves in its normal direction of travel (to the right as viewed in the figures), windmilling of the condenser fans is not produced since the air intakes 58 do not face the airflow caused by vehicle movement. In this manner, windmilling of the condenser fans 42 by ram air is prevented. The windmilling effect causes the fan motors to act as electric generators, resulting in electrical overloads in the system. This is positively precluded in the instant invention since air intakes 58 do not face in the direction of travel of the vehicle.

The arrows in FIG. 1 illustrate the airflow through one of the intakes 58, particularly the flow that passes into heat exchange relationship with the adjacent condenser section 52. It will be noted, however, that air is drawn into each intake 58 along its entire length, the air toward the front of the intake traversing a rearwardly directed path between side 24 and the adjacent partition 44 of compartment 34. In FIG. 2, the arrows illustrate the continued flow of air into the lateral passage between condenser section 54 and cross partition 46, whereupon the air passes across section 54 in heat exchange relationship thereto. Thus, the entire surface area of condenser coil 40 is exposed to the incoming air, a greater condenser capacity being achieved by the U-shaped configuration thereof in conjunction with the airflow paths established as just discussed which provide cooling of the entire condenser surface.

In agricultural applications, in particular, where intakes 58 are subjected to dust and other foreign matter in substantial quantities, it will be appreciated that such foreign matter entrained in the prevailing wind will directly impinge upon only one of the intakes 58 when the implement is traveling in a given direction. In fact, during travel directly upwind or downwind, neither intake 58 is subjected to direct impingement of foreign matter thereupon by the prevailing wind. Therefore, the selected filter media in intakes 58 clogs less rapidly than if only one intake were provided, permitting greater sustained operation before cleaning of the media is required.

When it ultimately becomes necessary to remove the foreign matter from the filter media in intakes 58, it is apparent that this is readily effected by releasing fasteners 60 and removing frames 62 from sides 24, whereupon the foreign matter may be removed by simply shaking the filter media. Frames 62 are then reinstalled and operation continues after only a brief interruption. Filtering is efficiently effected by the use of the screen 66 to remove chaff and larger debris, the filter 64 being employed in conjunction with screen 66 when fine dust and lint are to be encountered.

If pressurization of the cab is desired, valve member 72 is opened so that blowers 32 will draw in fresh air as well as the return air from within the cab. An increase in cab pressure above atmospheric pressure of approximately one-half to one pound per square inch is obtainable to prevent ingress of fine dust and the like often encountered in agricultural operations. The fresh air is injected into the airstream through the evaporator compartment 34 upstream from evaporator 36 to provide cooling of the fresh air as well as the return air drawn into the evaporator compartment through inlet 28. The use of a suitable filter in inlet 28 prevents buildup of foreign particles on evaporator 36 which, of course, would ultimately materially decrease the efficiency of refrigeration.

Having thus described the invention, what is claimed as new and desired to be secured by Letters Patent is:

1. In an air conditioner for a vehicle provided with a cab presenting a roof having a pair of spaced openings therein:
   a housing having a pair of separate compartments and adapted for mounting on said roof;
   a condenser coil in one of said compartments having a pair of spaced, opposed, upright sections facing outwardly transversely of the normal direction of travel of said vehicle, and a third section interconnecting said pair of sections,
   said housing having a pair of opposed sides facing transversely of said direction, and an air intake in each of said sides respectively communicating a corresponding section of said pair and an adjacent portion of said third section with the atmosphere,
   said one compartment having an air exhaust in communication with the atmosphere;
   a fan in said one compartment registering with said exhaust for drawing air through said intakes and across said coil to expose all three sections of the coil to initial heat exchange contact by the air, and thence expelling the air through said exhaust,
   the other of said compartments having an inlet and an outlet, each registering with a corresponding opening in said roof when the housing is mounted thereon;
   an evaporator in said other compartment; and
   a blower in said other compartment disposed to circulate air from said cab, when said housing is mounted thereon, across said evaporator along a flow path extending through said inlet and outlet.

2. The invention of claim 1:
   said housing having a rear wall interconnecting said sides and provided with said exhaust,
   said third section of the coil being upright and cooperating with said pair of sections to define a chamber in said one compartment between said coil and said rear wall,
   said fan being disposed in said chamber.

3. The invention of claim 2:
   said other compartment being spaced from said rear wall and disposed forwardly of said chamber,
   said housing having a front wall and including partition structure therewithin spaced inwardly of said sides and cooperating with said front wall to define said other compartment,
   said intakes extending from front to rear along a major expanse of said sides, whereby air drawn through the forward portions of said intakes travels rearwardly in the space between each side and the partition structure.

4. The invention of claim 3:
   said sections of the coil being disposed in a generally U-shaped configuration with said third section extending across said one compartment in substantial spaced relationship to said rear wall, and said pair of sections extending rearwardly and terminating proximal to said rear wall,
   said partition structure including a pair of opposed partitions facing respective sides and a cross partition in substantial spaced relationship to said front wall and interconnecting said pair of partitions, said third section of the coil and said cross partition being spaced apart to present a laterally extending passage therebetween for flow to said third section of said air drawn into the housing through said intakes.

5. The invention of claim 1:

said sections of the coil being disposed in a generally U-shaped configuration with said third section extending across said one compartment and said pair of sections extending rearwardly, generally in opposition to said direction.

6. The invention of claim 1:

and a removable filter medium in each of said intakes respectively in intercepting relationship to said air drawn through said intakes.

7. The invention of claim 1:

and a pair of frames adapted to mount therewithin filter media for said air drawn through said intakes, there being a plurality of quick-release fasteners on each of said sides of the housing around the intake therein for securing a corresponding frame thereto with the filter medium thereof spanning the intake.

8. The invention of claim 1:

and a duct communicating said other compartment with the atmosphere upstream from said blower and said evaporator, whereby to permit admixture of ambient air and air from said cab to pressurize the latter.

9. The invention of claim 8:

and a valve in said duct for controlling the quantity of ambient air drawn into said other compartment.

References Cited

UNITED STATES PATENTS

| 2,486,828 | 11/1949 | Dybuig | 62—427 |
| 2,799,143 | 7/1957 | Weigel | 62—244 |
| 2,869,333 | 1/1959 | Hoiby | 62—239 |
| 2,977,774 | 4/1961 | Ferris | 62—429 |

WILLIAM J. WYE, *Primary Examiner.*

U.S. Cl. X.R.

062—259